March 15, 1927.  J. WEBER  1,620,931
JUVENILE WAGON BODY
Filed June 28, 1924  2 Sheets-Sheet 1
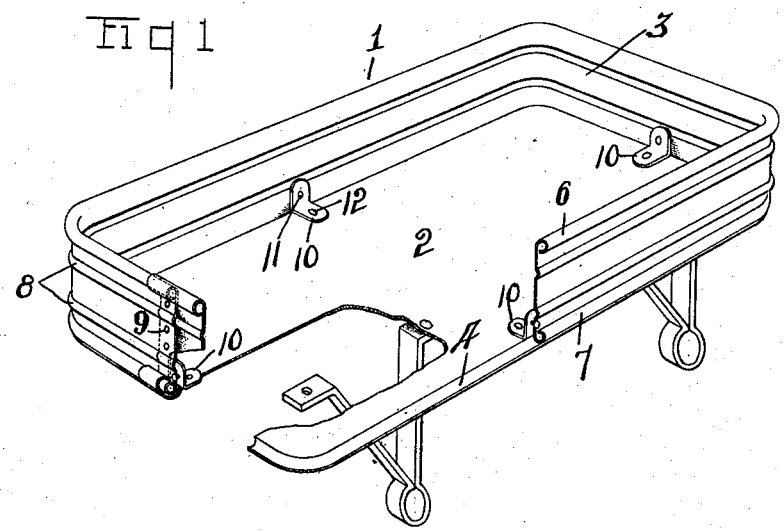
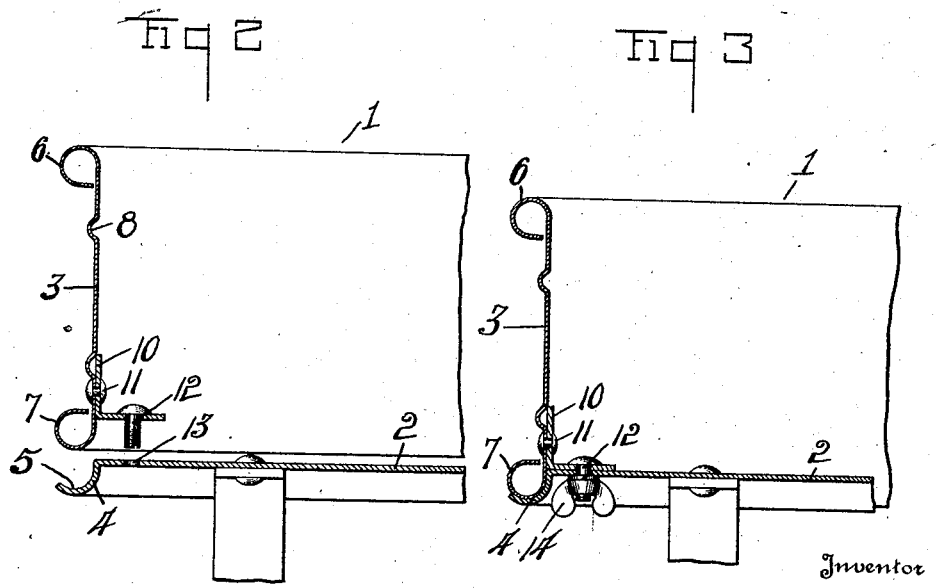
Inventor
John Weber
By Owen Owen & Crampton
Attorneys

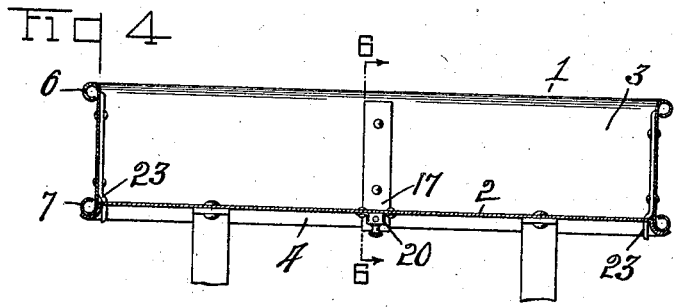
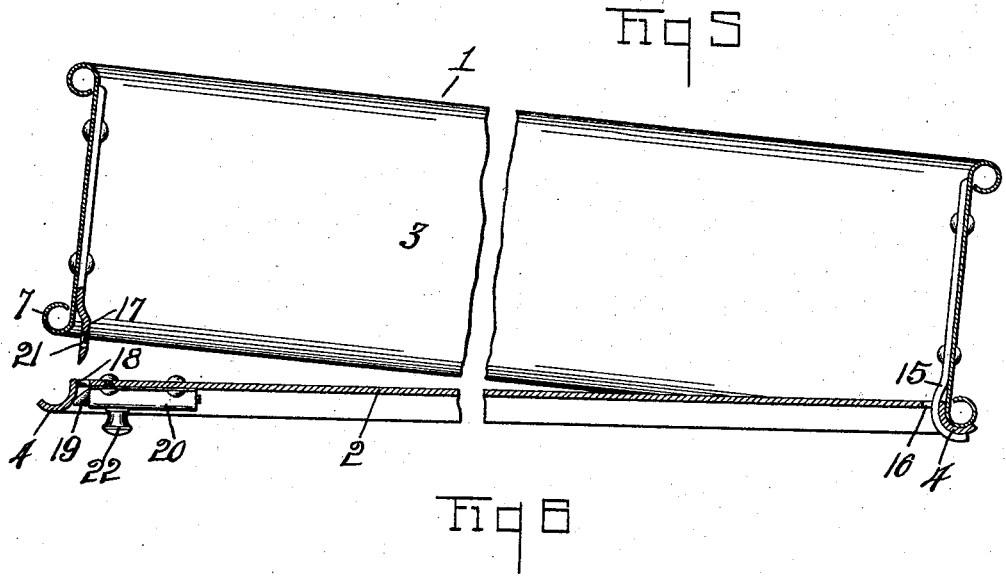
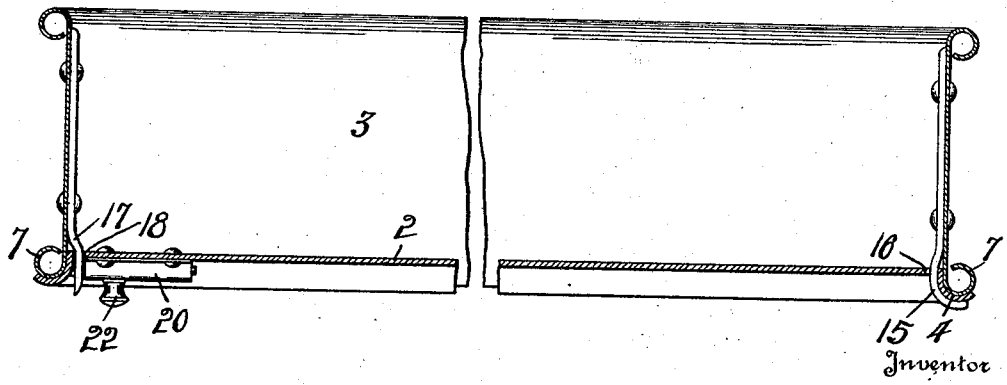

Patented Mar. 15, 1927.

1,620,931

UNITED STATES PATENT OFFICE.

JOHN WEBER, OF TOLEDO, OHIO, ASSIGNOR TO THE AMERICAN-NATIONAL COMPANY, OF TOLEDO, OHIO, A CORPORATION OF OHIO.

JUVENILE-WAGON BODY.

Application filed June 28, 1924. Serial No. 722,902.

This invention relates to juvenile vehicles, and particularly to those of the small handwagon type.

In vehicles of this class it is desirable for strength and durability of construction and simplicity of manufacture to make the box or body part of sheet metal and to have the platform or bottom and the side wall thereof composed of two easily separable parts to enable the side or body wall to be removed from the platform and placed around the running gear during storage or shipment to save space.

The object of the invention is the provision of a similar novel and strong wagon box or body of the character described, which is composed of two separable platform side wall parts formed of sheet metal and capable of being easily and quickly separated and secured together, the side wall when assembled on the platform being securely held against outward spreading or springing intermediate its corners.

The invention is fully described in the following specification, and while in its broader aspect it is capable of embodiment in numerous forms, two embodiments thereof are illustrated in the accompanying drawings, in which, Figure 1 is a perspective view of a wagon body embodying the invention, with parts broken away, and with some of the running gear parts attached thereto. Fig. 2 is an enlarged fragmentary section of the body taken through one of the securing means thereof with the platform and side wall in separated relation. Fig. 3 is a similar section with the body parts secured together. Fig. 4 is a cross-section of the body with the parts thereof secured together and provided with a different form of securing means. Fig. 5 is a central longitudinal section of the body equipped with the securing means, a part of which is shown in Fig. 4, with the body partly broken away and with the side wall tilted with respect to the platform preparatory to securing the same in locked engagement, and Fig. 6 is a section on the line 6—6 of Fig. 4.

Referring to the drawings, 1 designates the body of a wagon of the hand or juvenile type, such body being composed of the platform 2 and the side wall 3. The running gear, which is secured to and supports the platform, is only partially shown.

The platform 2 is formed in a single piece from sheet metal and is provided entirely around its edge with a flange 4 which extends down and outward from the platform edge, preferably in curved or rolled form, with its free edge turned slightly upward to form the flange with a shallow upwardly opening channel or seat 5.

The side wall 3 of the body is preferably composed of a single piece of sheet metal outwardly rolled at its upper and lower edges to form the respective edge beads 6 and 7, and is of rectangular form, preferably with rounded corners, and adapted at its lower edge to fit down closely around the edge of the platform 2 with its bead 7 seating in the channel or seat 5 of the edge flange 4 of the platform. The purpose of turning the outer edge of the flange 4 upward a slight extent is to add strength and rigidity to the platform and also to coact with the outer side portion of the bead 7 to resist or prevent an outward expansion or bulging of the body wall intermediate the corner portions thereof. Or in other words, to retain the body wall in close relation to the platform edge. The side wall 3 is shown as provided therearound with two reinforcing ribs 8, and the ends of the sheet metal strip forming the side wall are secured together by placing one in lapping relation to the other and telescoping the end portions of the beads 6 and 7, the ends of the body wall strip being secured in such relation by rivets 9 or in any other suitable manner.

The platform 2 and side wall 3 are firmly secured together in assembled relation by angle-brackets 10, one being disposed interiorly of the body at each side and end thereof intermediate the corners, with the upright leg of each bracket secured to the body by a rivet 11 and with the horizontal leg thereof extending inwardly a distance over the platform 2, and releasably secured thereto by a bolt 12, which extends down through a registering aperture 13 in the platform and is preferably provided at the under side of the platform with a winged nut 14 to facilitate a removal or tightening of the same without the use of a wrench. The brackets 10 serve to rigidly hold the sides and ends of the body wall to the platform edge, and co-operate with the edge flange 4 of the platform to prevent expansion or bulging of the sides and ends of the body wall intermediate the corners thereof.

In Figs. 4, 5 and 6 a slightly different form of means for releasably securing the platform 2 and body wall 3 together is provided. In this form of securing means the body wall is provided centrally at one end thereof with a tongue 15, which is riveted or otherwise rigidly secured to the inner side of the end and has its free end portion curved to adapt it to project down through a slot or opening 16 in the adjacent end portion of the platform and to engage outwardly under the edge flange 4 of the platform, as shown in Figs. 5 and 6. The opposite end of the body wall is provided at its inner side with a straight tongue 17 riveted or otherwise suitably secured to the body wall and adapted to project down through a registering opening 18 in the adjacent edge portion of the platform 2. A snap catch 19 is secured to the underside of the platform 2 by a holder 20, and when the tongue 17 is inserted into the opening 18 the nose of the catch 19 is adapted to have snap engagement with an opening 21 in the tongue, thus holding the tongue against removal from the platform opening 18 until the catch has been withdrawn from engagement with the tongue. To facilitate hand manipulation of the catch 19, it is provided with a control knob 22.

It is evident that in placing the body wall 3 in engagement with the platform 2 the curved tongue 15 is first inserted through the opening 16 and engaged under the flange 4, with the body wall at an incline to the platform, and the opposite end of the platform is then swung down into parallel relation to the platform to project the tongue 17 through the platform opening 18 and into snap engagement with the locking catch 19. With this form of the invention straight tongues 23 may be secured interiorly to the sides of the body wall intermediate their ends and projected through registering openings in the adjacent edge portions of the platform and co-operate with the upturned edge portions of the flanges 4 to prevent an outward spreading of the side portions of the body wall. This is not necessary, however, as under ordinary conditions of use the flanges 4 will prevent such spreading of the body wall sides.

I wish it understood that my invention is not limited to any specific construction, arrangement or form of the parts, as it is capable of numerous modifications and changes without departing from the spirit of the claims.

Having thus described my invention, what what I claim as new and desire to secure by Letters Patent is:

1. A juvenile wagon body having a rectangular sheet metal side wall and platform part, a curved trough formed on each side of said platform part, a roll formed on the lower edge of said side wall and fitting into said trough serving to reenforce said platform part, providing a support for said side wall part and preventing bulging of said side wall part in both directions, and means for detachably connecting and maintaining said parts in assembled relation and for permitting bodily removal of said side wall from said platform part.

2. A juvenile wagon body having a sheet metal platform with a downwardly, outwardly and upwardly extending flange around its edge, a sheet metal side wall having a beaded lower edge adapted to seat closely down around the platform edge and into the channel formed by the flange thereof, and means releasably securing the platform and side wall in assembled relation.

3. A juvenile wagon body having a sheet metal platform with a surrounding flange at its edge extending below the platform and forming an upwardly opening channel, a sheet metal side wall having a lower outwardly turned edge bead fitting around the edge of the platform and seating in the channel formed by the platform flange, said flange serving to reenforce the platform, and prevent bulging of the side wall in both directions, an angle bracket secured to the side wall and having a leg extending inwardly over the platform, and a bolt extending through said leg and platform adapted to receive a nut for detachably securing said parts together.

In testimony whereof I have hereunto signed my name to this specification.

JOHN WEBER.